(12) United States Patent
Yuan et al.

(10) Patent No.: US 10,661,551 B2
(45) Date of Patent: May 26, 2020

(54) THREE-DIMENSION PRINTING METHOD AND THREE-DIMENSION PRINTING SYSTEM

(71) Applicants: XYZprinting, Inc., New Taipei (TW); Kinpo Electronics, Inc., New Taipei (TW)

(72) Inventors: Kuo-Yen Yuan, New Taipei (TW); Bo-Yi Wu, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 444 days.

(21) Appl. No.: 15/466,887

(22) Filed: Mar. 23, 2017

(65) Prior Publication Data

US 2018/0186097 A1 Jul. 5, 2018

(30) Foreign Application Priority Data

Jan. 5, 2017 (TW) .............................. 106100348 A (51) Int. Cl.
*B33Y 50/02* (2015.01)
*B33Y 10/00* (2015.01)
(Continued)

(52) U.S. Cl.
CPC ............ *B33Y 50/02* (2014.12); *B29C 64/112* (2017.08); *B29C 64/20* (2017.08); *B29C 64/393* (2017.08);
(Continued)

(58) Field of Classification Search
CPC ......... B33Y 50/02; B33Y 10/00; B33Y 30/00; B29C 37/0025; B29C 39/025;
(Continued)

(56) References Cited

U.S. PATENT DOCUMENTS

| | | |
|---|---|---|
| 2015/0137423 A1 | 5/2015 | Ding |
| 2016/0221264 A1 | 8/2016 | Doherty et al. |
| 2016/0279879 A1 | 9/2016 | Zheng et al. |

FOREIGN PATENT DOCUMENTS

| | | |
|---|---|---|
| EP | 3015251 | 5/2016 |
| JP | H09169056 | 6/1997 |

(Continued)

OTHER PUBLICATIONS

"Search Report of Europe Counterpart Application", dated Nov. 15, 2017, p. 1-p. 7, in which the listed references were cited.
(Continued)

*Primary Examiner* — Stella K Yi (74) *Attorney, Agent, or Firm* — JCIPRNET (57) ABSTRACT

A three-dimension (3-D) printing method and a 3-D printing system are provided. The method includes: generating printing information according to model information of a 3-D object; controlling a 3-D printing apparatus to perform a 3-D printing operation, so as to print a supporting object and the 3-D object, wherein the supporting object is used to support the 3-D object. Furthermore, the step of generating the printing information includes: detecting a floating contour of the 3-D object on the first printing layer according to the model information; and removing printing information of the supporting object from printing information corresponding to a second printing layer according to the floating contour. Thereby, difficulty of removing the supporting object can be reduced.

4 Claims, 11 Drawing Sheets

(51) Int. Cl.
  *B33Y 30/00*     (2015.01)
  *B29C 64/40*     (2017.01)
  *B29C 64/20*     (2017.01)
  *B29C 64/112*    (2017.01)
  *B29C 64/393*    (2017.01)

(52) U.S. Cl.
  CPC .............. *B29C 64/40* (2017.08); *B33Y 10/00* (2014.12); *B33Y 30/00* (2014.12)

(58) Field of Classification Search
  CPC ..... B29C 39/12; B29C 39/123; B29C 39/146; B29C 39/20; B29C 39/203; B29C 41/22; B29C 41/32; B29C 43/20; B29C 43/203; B29C 43/265; B29C 43/30; B29C 43/305; B29C 44/24; B29C 45/16; B29C 64/00; B29C 64/124; B29C 64/153; B29C 64/188; B29C 64/194; B29C 64/20; B29C 64/205; B29C 64/393; B29C 64/386; B29C 64/40
  See application file for complete search history.

(56) References Cited

FOREIGN PATENT DOCUMENTS

| | | |
|---|---|---|
| JP | 2001009920 | 1/2001 |
| JP | 2004255839 | 9/2004 |
| JP | 2015009495 | 1/2015 |
| JP | 2016198958 | 12/2016 |
| JP | 2017052177 | 3/2017 |
| TW | I518583 | 1/2016 |
| TW | I541142 | 7/2016 |
| TW | I548535 | 9/2016 |
| TW | I548539 | 9/2016 |
| WO | 2009047355 | 4/2009 |
| WO | 2015040410 | 3/2015 |
| WO | 2016199131 | 12/2016 |

OTHER PUBLICATIONS

"Office Action of Taiwan Counterpart Application," dated Oct. 31, 2019, p. 1-p. 5.

"Office Action of Japan Counterpart Application," dated Nov. 19, 2019, p. 1-p. 5.

THREE-DIMENSION PRINTING METHOD AND THREE-DIMENSION PRINTING SYSTEM

CROSS-REFERENCE TO RELATED APPLICATION

This application claims the priority benefit of Taiwan application serial no. 106100348, filed on Jan. 5, 2017. The entirety of the above-mentioned patent application is hereby incorporated by reference herein and made a part of this specification.

BACKGROUND

Technical Field

The disclosure is directed to a three-dimensional (3-D) printing mechanism and more particularly, to a 3-D printing method and a 3-D printing system.

Description of Related Art

When a three-dimensional (3-D) printing apparatus performs a 3-D printing task, if a 3-D object to be printed has an extended structure with no support thereunder or no lateral support, the 3-D printing apparatus may print a supporting object used to support the extended structure while printing the 3-D object, thereby preventing the extended structure from collapsing during the process of printing. Generally speaking, the supporting object is calculated and created in a way that the extended structure is capable of being directly supported by a supporting object. Therefore, the supporting object under the extended structure or at a side of the extended structure usually gets jammed after receiving a pressure from the top or the side and has difficulty of being removed.

SUMMARY

Accordingly, the disclosure provides a three-dimensional (3-D) printing method and a 3-D printing system capable of reducing difficulty in subsequently disassembling a supporting object.

According to an embodiment of the disclosure, a 3-D printing method applicable to a 3-D printing system including a storage apparatus and a 3-D printing apparatus is provided. The storage apparatus is configured to store model information of a 3-D object. The 3-D printing method includes: generating printing information according to the model information of the 3-D object, wherein the printing information includes printing information corresponding to a first printing layer of the 3-D object and printing information corresponding to a second printing layer of the 3-D object, wherein the first printing layer is adjacent to the second printing layer; and controlling the 3-D printing apparatus to perform a 3-D printing operation on a plurality of printing layers including the first printing layer and the second printing layer according to the printing information, so as to print a supporting object and the 3-D object, wherein the supporting object is used to support the 3-D object. In addition, the step of generating the printing information according to the model information of the 3-D object includes: detecting a floating contour of the 3-D object on the first printing layer according to the model information; and removing printing information of the supporting object from the printing information corresponding to the second printing layer according to the floating contour.

In an embodiment of the disclosure, the plurality of printing layers further include a third printing layer, and the step of generating the printing information according to the model information of the 3-D object further includes: obtaining a contour of the 3-D object on the third printing layer according to the model information; and performing an extending operation on the contour of the 3-D object on the third printing layer to obtain spacing information. The spacing information corresponds to a distance between the 3-D object and the supporting object on the third printing layer, and the distance is greater than 0.

In an embodiment of the disclosure, the step of generating the printing information according to the model information of the 3-D object further includes: generating a contour of the supporting object on the third printing layer according to the contour of the 3-D object on the third printing layer and the spacing information; and generating printing information corresponding to the third printing layer among the printing information according to the contour of the 3-D object on the third printing layer and the contour of the supporting object on the third printing layer.

According to another embodiment of the disclosure, a 3-D printing system including a storage apparatus, a 3-D printing apparatus and a processor is provided. The storage apparatus is configured to store model information of a 3-D object. The processor is coupled to the storage apparatus and the 3-D printing apparatus and configured to: generate printing information according to the model information of the 3-D object, wherein the printing information includes printing information corresponding to a first printing layer of the 3-D object and printing information corresponding to a second printing layer of the 3-D object, wherein the first printing layer is adjacent to the second printing layer; and control the 3-D printing apparatus to perform a 3-D printing operation on a plurality of printing layers including the first printing layer and the second printing layer according to the printing information, so as to print a supporting object and the 3-D object, wherein the supporting object is used to support the 3-D object. In addition, the operation of generating the printing information according to the model information of the 3-D object includes: detecting a floating contour of the 3-D object on the first printing layer according to the model information; and removing printing information of the supporting object from the printing information corresponding to the second printing layer according to the floating contour.

In an embodiment of the disclosure, the plurality of printing layers further include a third printing layer, and the operation of generating the printing information according to the model information of the 3-D object further includes: obtaining a contour of the 3-D object on the third printing layer according to the model information; and performing an extending operation on the contour of the 3-D object on the third printing layer to obtain spacing information The spacing information corresponds to a distance between the 3-D object and the supporting object on the third printing layer, and the distance is greater than 0.

In an embodiment of the disclosure, the operation of generating the printing information according to the model information of the 3-D object further includes: generating a contour of the supporting object on the third printing layer according to the contour of the 3-D object on the third printing layer and the spacing information; and generating printing information corresponding to the third printing layer among the printing information according to the contour of the 3-D object on the third printing layer and the contour of the supporting object on the third printing layer.

In an embodiment of the disclosure, an extending direction of the extending operation is parallel to the third printing layer.

In an embodiment of the disclosure, a projection area of the floating contour on the second printing layer is not included in a contour range of the 3-D object on the second printing layer.

To sum up, the disclosure is intent to separate the supporting object used to support the 3-D object from the 3-D object by a distance in the 3-D printing operation, so as to reduce the difficulty in subsequently disassembling the supporting object.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
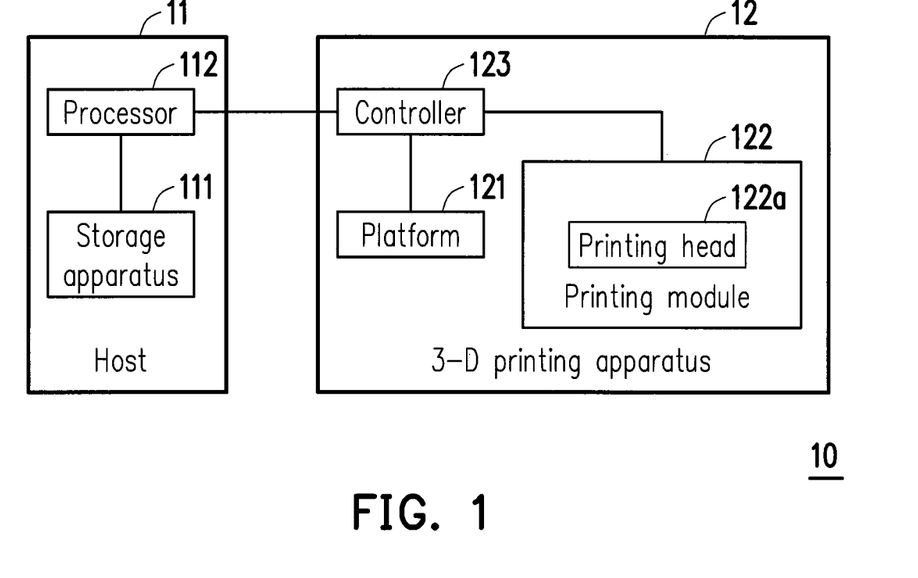
FIG. 1 is a schematic diagram illustrating a three-dimensional (3-D) printing system according to an embodiment of the disclosure.

FIG. 1 is a schematic diagram illustrating a three-dimensional (3-D) printing system according to an embodiment of the disclosure. Referring to FIG. 1, a 3-D printing system 10 includes a host 11 and a 3-D printing apparatus 12. The 3-D printing apparatus 12 is configured to perform a 3-D printing operation. The host 11 is coupled to the 3-D printing apparatus 12 and configured to control the 3-D printing apparatus 12. For example, the host 11 may send a control instruction to instruct the 3-D printing apparatus 12 to perform the 3-D printing operation. The host 11 may be an electronic apparatus capable of transmitting, storing and processing data, for example, a smart cell phone, a tablet computer, a desktop computer, a notebook computer or an industrial computer. In addition, the host 11 may also be integrated with the 3-D printing apparatus 12 as one single apparatus.

The host 11 includes a storage apparatus 111 and a processor 112. The storage apparatus 111 is configured to store data and may be a buffer memory, an internal storage medium, an external storage medium, a storage apparatus of other types or a combination of the aforementioned apparatuses. For example, the buffer memory may include a random access memory, a read-only memory or the like. For example, the internal storage medium may include a hard disk drive (HDD), a solid state disk (SSD), a flash storage device or the like. For example, the external storage medium may include an external HDD, a USB drive, a cloud storage device or the like.

The processor 112 is coupled to the storage apparatus 111 and configured to access the storage apparatus 111 and generate the control instruction used to control the 3-D printing apparatus 12. In addition, the processor 112 may control the operation of each component in the host 11. For example, the processor 112 may be a central processing unit (CPU) or other programmable devices for general purpose or special purpose such as a microprocessor, a digital signal processor (DSP), a programmable controller, an application specific integrated circuit (ASIC), a programmable logic device (PLD) or other similar devices or a combination of above-mentioned devices.

Figure 2:
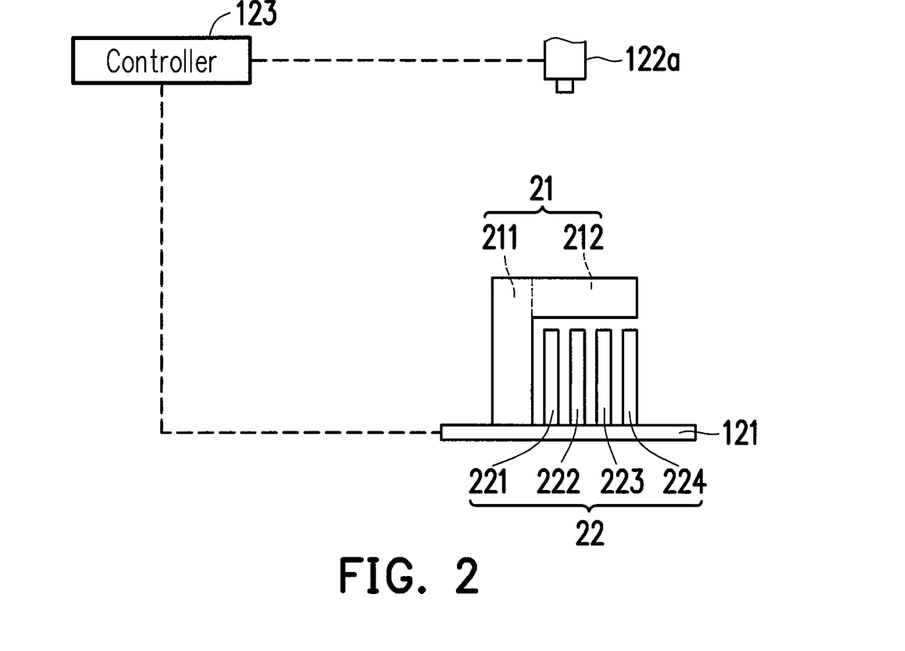
FIG. 2 is a schematic diagram illustrating a 3-D printing operation according to an embodiment of the disclosure.

FIG. 2 is a schematic diagram illustrating a 3-D printing operation according to an embodiment of the disclosure. Referring to both FIG. 1 and FIG. 2, the 3-D printing apparatus 12 includes a platform 121, a printing module 122 and a controller 123. The platform 121 and the printing module 122 are both coupled to the controller 123. The printing module 122 includes a printing head 122a. The printing head 122a may be disposed above the platform 121 to perform the 3-D printing operation including feeding out a building material and a dye. It should be noted that a person ordinarily skilled in the art should understand that the printing module 122 may further include the other components (e.g., a supply pipeline, a print head linking mechanism, etc.) that work with the printing head 122a to complete the 3D printing operations, which is not described in detail here.

When the 3D printing operation is performed, the printing head 122a starts printing layer by layer from a bottom-most layer of a 3D object 21 and gradually forms the 3D object 21 on a bearing surface of the platform 121. Moreover, in the 3D printing operations, the printing head 122a moves in changeable directions above the platform 121 and feeds a forming material in a molten state. Afterwards, the forming material is solidified layer by layer on the platform 121 and then forms the 3D object 21.

The controller 123 is configured to control the printing head 122a to move and feed out the building material according to the control instruction from the processor 112. For example, the controller 130 may be a microprocessor, a digital signal processor, a programmable controller, an embedded controller, application specific integrated circuits, a programmable logic device, another similar processing device, or a combination of these devices.

In the present embodiment, the storage apparatus 111 stores model information of the 3-D object 21. For example, the model information includes a 3-D model of the 3-D object 21 and a plurality of image files corresponding to the 3-D model. For example, the processor 112 may perform a layer-slicing operation on the 3-D model of the 3-D object 21, so as to obtain the image files. The image files may be used to describe information, such as contours of the 3-D object 21 on different printing layers, coloring regions and dye colors to be used. The processor 112 generates printing information according to the model information. Then, the processor 112 sends control instructions according to the printing information to control the 3-D printing apparatus 12 to perform the 3-D printing operation corresponding to the 3-D object 21.

In the embodiment illustrated of FIG. 2, for descriptive convenience, the 3-D object 21 to be printed is considered as including a main body 211 and an extension portion 212. The main body 211 and the extension portion 212 are connected with each other. In another embodiment, the 3-D object 21 also may not have to be divided into the main body 211 and the extension portion 212. According to the side view of FIG. 2, if a supporting object 22 is not printed under the extension portion 212, the extension portion 212 has a high risk to collapse due to lack of support thereunder. In addition, in the absence of lateral support, the 3-D object 21 is easy to skew or tilt. Thus, during the 3-D printing operation corresponding to 3-D object 21, the 3-D printing apparatus 12 may automatically print the supporting object 22 and the 3-D object 21 according to the printing information from the host 11. Therein, the printing information includes information for instructing to print the supporting object 22 and the 3-D object 21. In other words, the supporting object 22 is printed along with the 3-D object 21 in the 3-D printing operation corresponding to the 3-D object 21, and the supporting object 22 is used to support the 3-D object 21 during the process of printing the 3-D object 21.

As illustrated in FIG. 2, the printed supporting object 22 is at least used to support the extension portion 212 of the 3-D object 21. It should be noted that in the embodiment illustrated in FIG. 2, the 3-D object 21 has an L-shaped structure, and the supporting object 22 includes 4 supporting structures 221, 222, 223 and 224. However, in some embodiments that are not mentioned, both the 3-D object 21 and the supporting object 22 printed out in the 3-D printing operation performed according to the printing information may have different shapes, structures and/or numbers.

Figure 3:
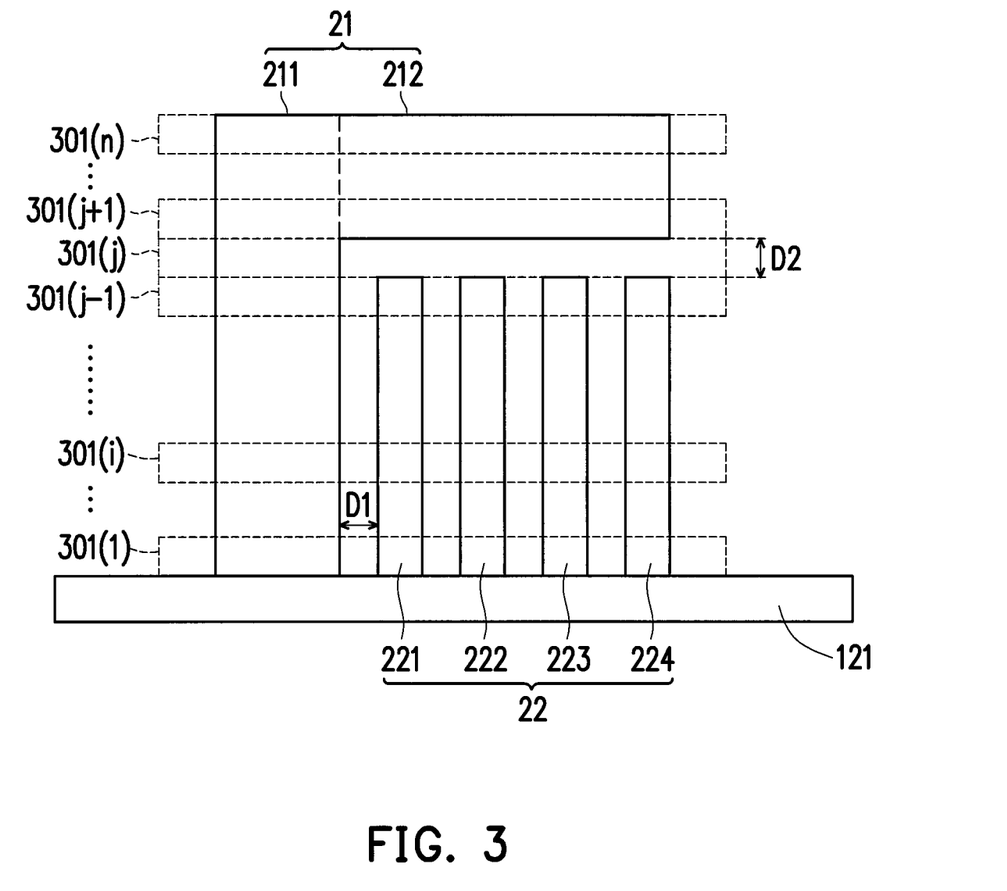
FIG. 3 is a schematic diagram illustrating a 3-D printing operation according to another embodiment of the disclosure.

FIG. 3 is a schematic diagram illustrating a 3-D printing operation according to another embodiment of the disclosure. It should be noted that FIG. 3 mainly presents a side view of the platform 121, the 3-D object 21 and the supporting object 22. Referring to FIG. 3, according to the printing information, printing operations corresponding to printing layers 301(1) to 301(n) are sequentially performed. During the printing operations corresponding to the printing layers 301(1) to 301(j−1), a lower part of the main body 211 and the supporting object 22 are gradually printed out on the platform 121. Then, during the printing operations corresponding to the printing layers 301(j) to 301(n), an upper part of the main body 211 and the extension portion 212 are gradually printed out.

In the embodiment illustrated in FIG. 3, a distance D1 is between the supporting object 22 and the main body 211 and is greater than 0. For example, the distance D1 may be a distance between the supporting structures 221 and the main body 211. In an embodiment, the distance D1 is a horizontal distance in parallel to the carrying surface of the platform 121. In another embodiment, the distance D1 is a non-horizontal distance not in parallel to the carrying surface of the platform 121.

In an embodiment, the processor 112 obtains a contour of the main body 211 on a specific printing layer (which is also referred to as a third printing layer) according to the model information in the storage apparatus 111. The processor 112 performs an extending operation on the contour of the main body 211 on the third printing layer to obtain spacing information. The spacing information corresponds to a distance between the main body 211 and the supporting object 22 on the third printing layer, and the distance is greater than 0. Taking FIG. 3 as an example, the third printing layer may be one of the printing layers 301(1) to 301(j), and the distance may be the distance D1.

In an embodiment, the processor 112 generates a contour of the supporting object 22 on the third printing layer according to the contour of the main body 211 on the third printing layer and the spacing information. According to the contour of the main body 211 on the third printing layer and the contour of the supporting object 22 on the third printing layer, the processor 112 generates printing information corresponding to the third printing layer among the printing information to be transmitted to the 3-D printing apparatus 12. For example, if the third printing layer is the printing layer 301(1), the 3-D printing apparatus 12 may print out a bottom (or a base) of the main body 211 and a bottom (or a base) of the supporting object 22 according to the printing information corresponding to the printing layer 301(1) during the 3-D printing operation corresponding to the printing layer 301(1). If the third printing layer is the printing layer 301(i), the 3-D printing apparatus 12 may print out a corresponding part of the main body 211 and a corresponding part of the supporting object 22 according to the printing information corresponding to the printing layer 301(i) during the 3-D printing operation corresponding to the printing layer 301(i). Alternatively, if the third printing layer is the printing layer 301(j−1), the 3-D printing apparatus 12 may print out the corresponding part of the main body 211 and the corresponding part of the supporting object 22 (which is a top of the supporting object 22, for example, in FIG. 3) according to the printing information corresponding to the printing layer 301(j−1) during the 3-D printing operation corresponding to the printing layer 301(j−1).

Figure 4A:
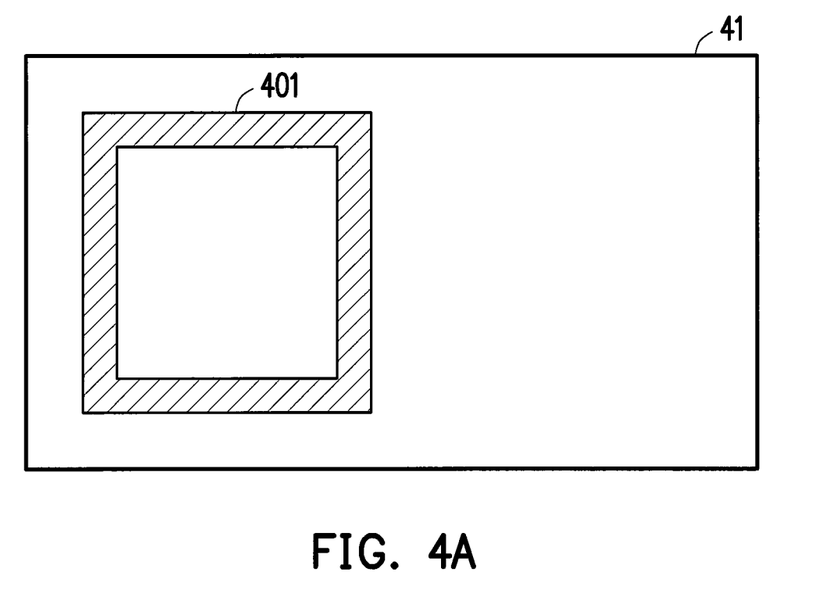
FIG. 4A to FIG. 4C are schematic diagrams of generating printing information corresponding to a third printing layer according to an embodiment of the disclosure.

FIG. 4A to FIG. 4C are schematic diagrams of generating printing information corresponding to a third printing layer according to an embodiment of the disclosure. Referring to FIG. 3 and FIG. 4A, it is assumed that the model information of the 3-D object 21 includes an image file 41. The image file 41 corresponds to the third printing layer. For example, the image file 41 may be used to describe information, such as the contour of the 3-D object 21 (or the main body 211), the coloring region and the dye color on the third printing layer. Thus, according to the image file 41, the processor 112 may obtain a contour 401 (marked with slashes) of the 3-D object 21 (or the main body 211) on the third printing layer.

Figure 4B:
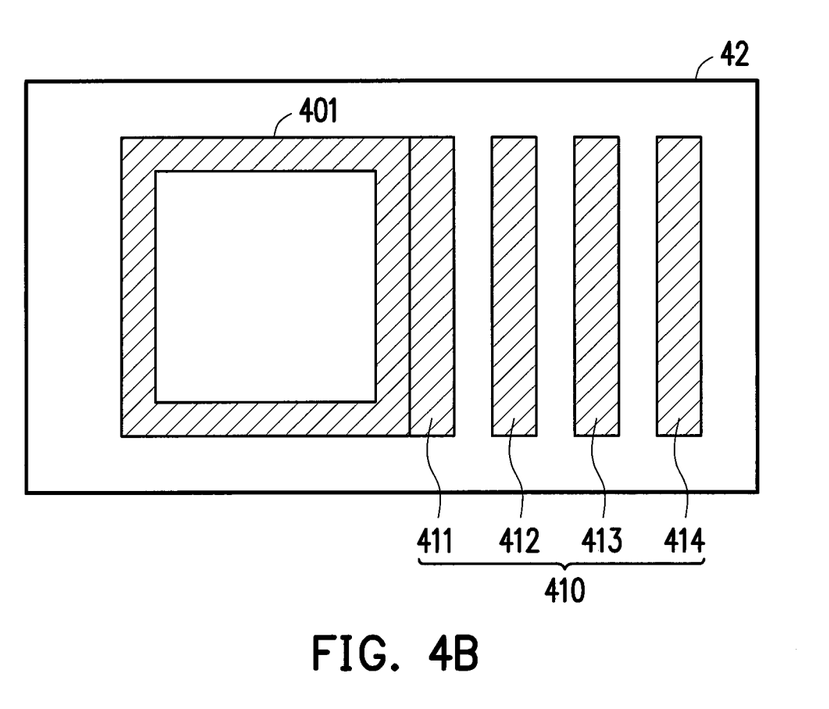

Referring to FIG. 3 and FIG. 4B, generally, in order to prevent the 3-D object 21 or the extension portion 212 thereof from collapsing during the 3-D printing operation, the processor 112 may automatically generate a contour of the supporting object 22 on the third printing layer according to the contour 401 of the 3-D object 21 (or the main body 211) on the third printing layer. For example, according to the contour 401 of the main body 211 on the third printing layer, the processor 112 may automatically generate an image file 42. The image file 42 may be used to describe the contour 401 of the main body 211 on the third printing layer and a contour 410 of the supporting object 22 on the third printing layer. For example, the contour 410 may include contours 411 to 414 of supporting structures 221 to 224. According to FIG. 4B, at least a part of the contour 410 of the supporting object 22 on the third printing layer contacts (or tightly supports) the contour 401 of the main body 211 on the third printing layer. Thus, the supporting object 22 subsequently and automatically printed out according to the image file 42 also tightly supports the main body 211. In an embodiment, the contour 410 is also referred to as a preset contour of the supporting object 22 on the third printing layer.

Figure 4C:
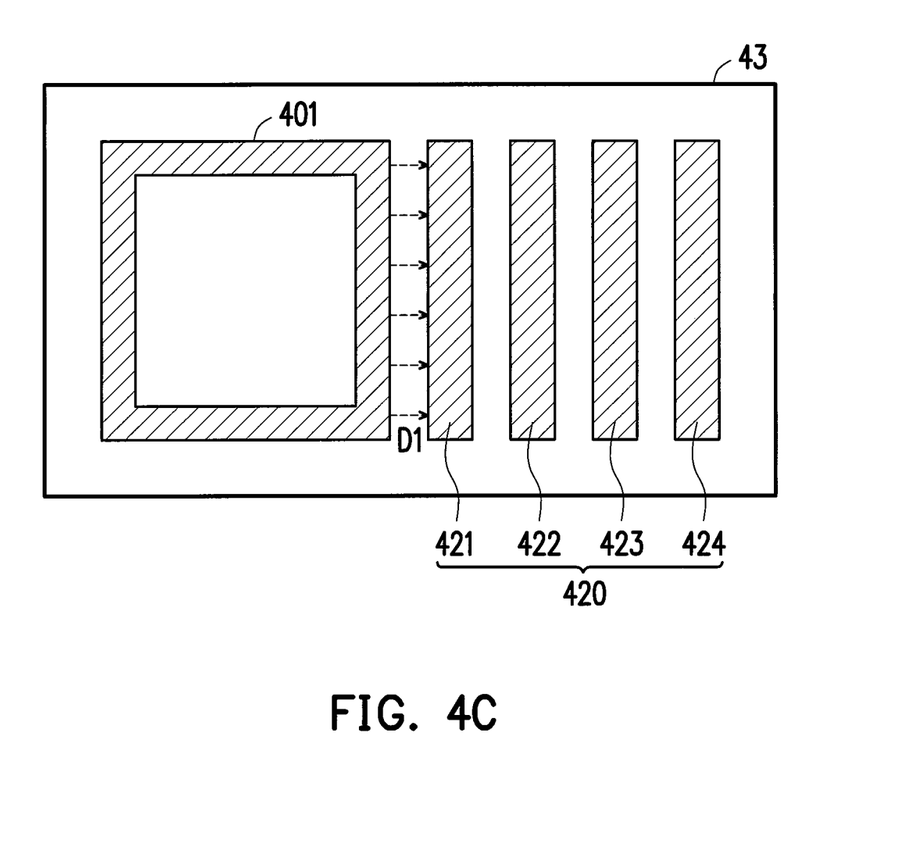

Referring to FIG. 3 and FIG. 4C, in the present embodiment, the processor 112 performs an extending operation on the contour 401 of the 3-D object 21 (or the main body 211) on the third printing layer. For example, during the extending operation, the processor 112 separates the contour 401 of the main body 211 on the third printing layer from the preset contour 410 of the supporting object 22 on the third printing layer by a preset distance (for example, the distance D1). In the meantime, the processor 112 generates spacing information used to describe the preset distance. Then, the processor 112 generates a new image file 43 according to the contour 401 of the main body 211 on the third printing layer and the spacing information. For example, the image file 43 includes the contour 401 of the main body 211 on the third printing layer and a new contour 420 of the supporting object 22 on the third printing layer, and the contour 401 is apart from the contour 420 by the preset distance (for example, the distance D1). When the printing information for printing the 3-D object 21 is transmitted, the printing information described by the image file 43 serves as the printing information corresponding to the third printing layer and is transmitted to the 3-D printing apparatus 12. Thereby, the 3-D printing apparatus 12 may perform the 3-D printing operation corresponding to one of the printing layers 301(1) to 301(j) illustrated in FIG. 3 according to the printing information described by the image file 43.

It should be noted that the image files 41 to 43 all describe the contour 401 of the 3-D object 21 (or the main body 211) on the third printing layer, and thus, an extending direction of the extending operation is also parallel to third printing layer. Additionally, the processor 112 actually performs the extending operation by means of data processing.

In an embodiment, the 3-D printing operation corresponding to the third printing layer may cause the top of the printed supporting object 22 to directly contact the extension portion 212, which results in difficulty in disassembling the supporting object 22. Thus, in an embodiment, the processor 112 further detects a floating contour of the extension portion 212 on a specific printing layer (which is also referred to as a first printing layer) according to the model information in the storage apparatus 111. The processor 112 generates printing information corresponding to the first printing layer among the printing information to be transmitted to the 3-D printing apparatus 12 according to the floating contour. Additionally, the processor 112 removes printing information of the supporting object 22 from printing information corresponding to another printing layer (which is also referred to as a second printing layer), where the first printing layer is adjacent to second printing layer.

In an embodiment, the first printing layer refers to a printing layer which may directly contact the supporting object 22 among the printing layers for printing the extension portion 212, and the floating contour is a contour of the extension portion 212 in this printing layer. In addition, the second printing layer refers to a printing layer which may directly contact the extension portion 212 among the printing layers for printing the supporting object 22, and the second printing layer is located under the first printing layer. Through removing the printing information of the supporting object 22 from the printing information corresponding to the second printing layer, the top of the printed supporting object 22 may be ensured not to contact the extension portion 212.

Taking FIG. 3 as an example, the first printing layer is the printing layer 301(j+1), the floating contour is the contour of the extension portion 212 on the printing layer 301(j+1), and the second printing layer is the printing layer 301(j). After the printing information of the supporting object 22 is removed from the printing information corresponding to the printing layer 301(j), it may be ensured that during the 3-D printing operation performed by the 3-D printing apparatus 12 according to the printing information from the host 11, the top of the printed supporting object 22 is apart from the extension portion 212 by a distance D2, and the distance D2 is also greater than 0. For example, the distance D2 is about a height of one printing layer (for example, the printing layer 301(j)) or more.

In an embodiment, the processor 112 may compare whether a contour of the extension portion 212 on a specific printing layer is included in a contour range of another printing layer of the 3-D object 21 under the specific printing layer along a projection direction of the specific printing layer, so as to detect the floating contour. If the contour of the extension portion 212 on the specific printing layer is included in the contour range of said another printing layer of the 3-D object 21 under the specific printing layer along the projection direction of the specific printing layer, the processor 112 determines that the contour of the extension portion 212 on the specific printing layer is not the floating contour. Otherwise, if the contour of the extension portion 212 on the specific printing layer is not included in the contour range of said another printing layer of the 3-D object 21 under the specific printing layer along the projection direction of the specific printing layer, the processor 112 determines that the contour of the extension portion 212 on the specific printing layer is the floating contour.

Taking FIG. 3 as an example, a projection area, projected on the printing layer 301(j), of the contour of the extension portion 212 on the printing layer 301(j+1) is not included in a contour range of the 3-D object 21 (or the main body 211) on the printing layer 301(j). Thereby, the processor 112 may determine that the contour of the extension portion 212 on the printing layer 301(j+1) is a floating contour. Otherwise, according to FIG. 3, the projection area, projected on the printing layer 301(n−1), of the contour of the extension portion 212 on the printing layer 301(n) is included in a contour range of the 3-D object 21 on the printing layers 301(n−1). Thus, the processor 112 determines that the contour of the extension portion 212 on the printing layer 301(n) is not a floating contour. Then, the processor 112 marks the printing layer 301(j+1) including the floating contour as the first printing layer and marks the printing layer 301(j) as the second printing layer.

Figure 5A:
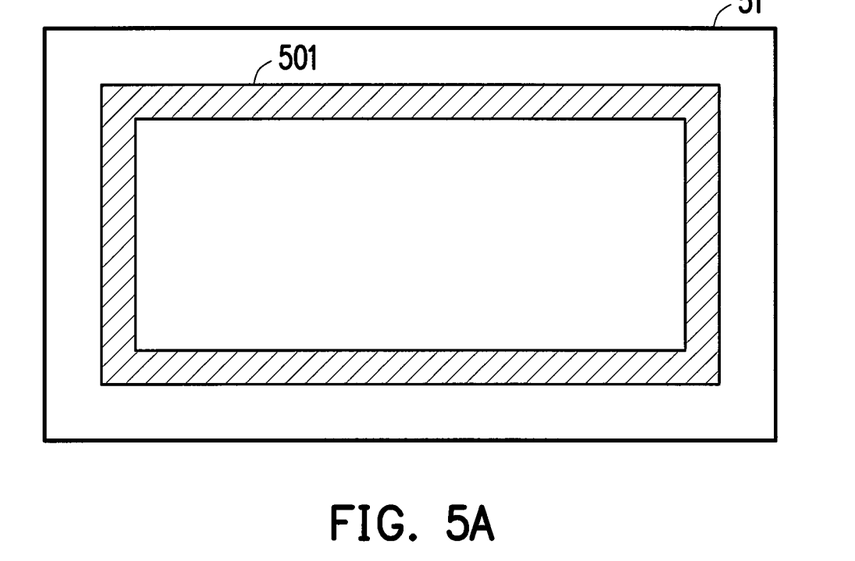
FIG. 5A to FIG. 5C are schematic diagrams of removing printing information of a supporting object from printing information corresponding to a second printing layer according to an embodiment of the disclosure.
Figure 5B:
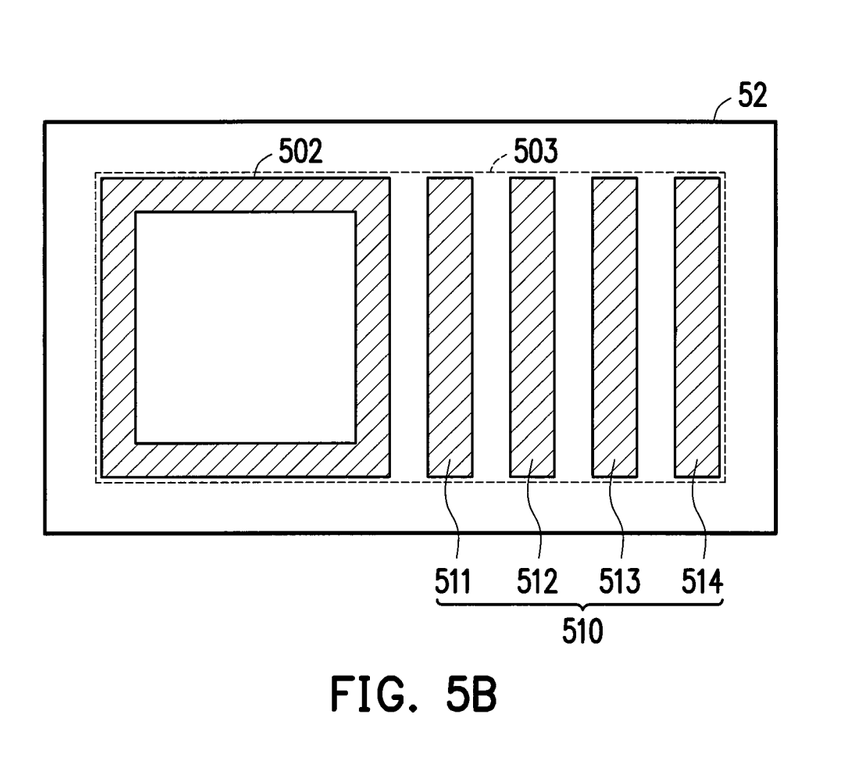
Figure 5C:
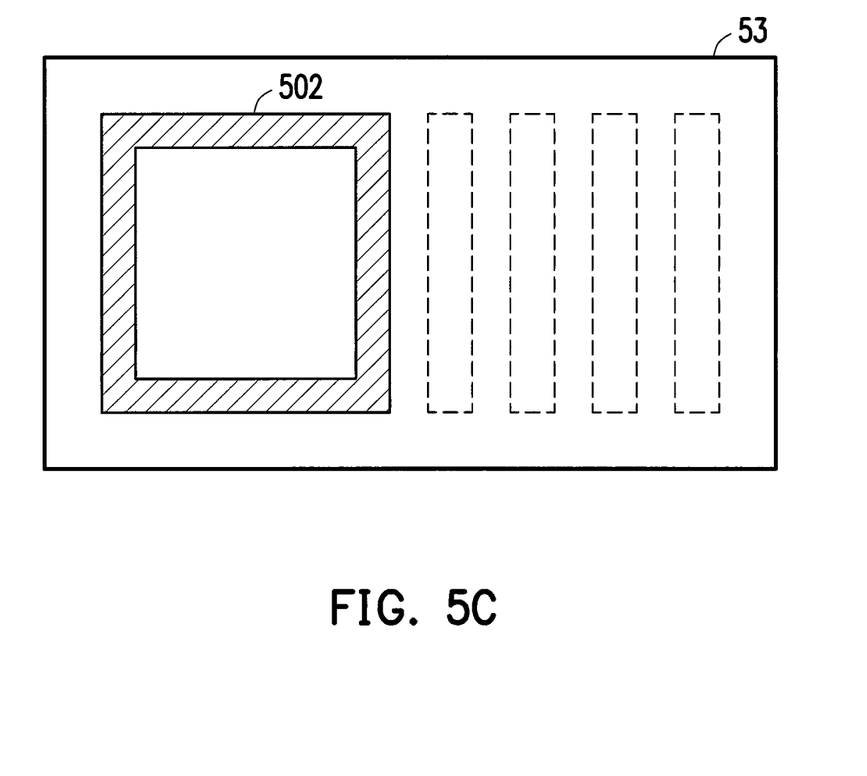

FIG. 5A to FIG. 5C are schematic diagrams of removing printing information of the supporting object from the printing information corresponding to the second printing layer according to an embodiment of the disclosure. Referring to FIG. 3, FIG. 5A to FIG. 5C, it is assumed that model information of the 3-D object 21 includes image files 51 and 52. The image file 51 corresponds to the printing layer 301(j+1) and is used to describe the contour 501 of the 3-D model 21 on the printing layer 301(j+1). The image file 52 corresponds to the printing layers 301(j) and is used to describe the contour 502 of the 3-D model 21 (or the main body 211) on the printing layer 301(j) and the contour 510 of the supporting object 22 on the printing layer 301(j). For example, the contour 510 may include contours 511 to 514 of the supporting structures 221 to 224 on the printing layer 301(*j*). It should be noted that in FIG. 5B, the contour 510 is generated by the aforementioned extending operation, and thus, the contour 510 does not contact the contour 502. However, in another embodiment, the contour 510 may also not be adjusted by the extending operation and thus, contact the contour 502.

In an embodiment, the processor 112 compares the image files 51 and 52 and determines whether a projection area 503 of the contour 501 in the image file 52 is included in a contour range of the contour 502. As shown in FIG. 5B, the projection area 503 is not included in the contour range of the contour 502. Thus, the processor 112 considers at least a part of the contour 501 as the floating contour. Then, the processor 112 removes the contour 510 belonging to the supporting object 22 from the image file 52 and generates a new image file 53 (as illustrated in FIG. 5C) corresponding to the printing layer 301(*j*). Then, the processor 112 may transmit printing information described by the image files 51 and 53 to the 3-D printing apparatus 12, such that the 3-D printing apparatus 12 may perform the printing operations corresponding to the printing layers 301(*j*) and 301(*j*+1) according to the printing information.

In other words, if the 3-D printing operation corresponding to the printing layer 301(*j*) is performed according to the original image file 52 corresponding to the printing layer 301(*j*), the top of the printed supporting object 22 may probably contact and even jam the extension portion 212. However, when the 3-D printing operation corresponding to the printing layer 301(*j*) is performed according to the new image file 53 corresponding to the printing layer 301(*j*), the top of the printed supporting object 22 may not contact the extension portion 212, such that the subsequent disassembly of the supporting object 22 is easier. Additionally, the printing information corresponding to the rest of the printing layers, i.e., 301(*j*+2) to 301(*n*), may directly transmitted to the 3-D printing apparatus 12. Thereby, the 3-D printing apparatus 12 is capable of printing out the 3-D object 21 and the supporting object 22 as illustrated in FIG. 3, and the 3-D object 21 may not contact the supporting object 22.

In an embodiment, after the floating contour and the first printing layer including the floating contour are detected, the processor 112 may also control the printing information of the supporting object not to be added to the image file corresponding to the first printing layer. Taking FIG. 3 as an example, in an embodiment, after the printing layer 301(*j*+1) is determined as including the floating contour of the extension portion 212, the printing information of the supporting object 22 may be allowed to be added to the printing information corresponding to the printing layers 301(1) to 301(*j*−1) and then transmitted to the 3-D printing apparatus 12, but not allowed to be added to the printing information corresponding to the printing layer 301(*j*).

It should be noted that the 3-D object 21 with a horizontal and a vertical surfaces serves as an example in all the embodiments described above. However, in another embodiment, the 3-D object to be printed may also have an inclined surface, and the supporting object used to support the 3-D object is apart from the inclined surface by a distance, and the 3-D object is at least supported by the supporting object through the inclined surface.

Figure 6A:
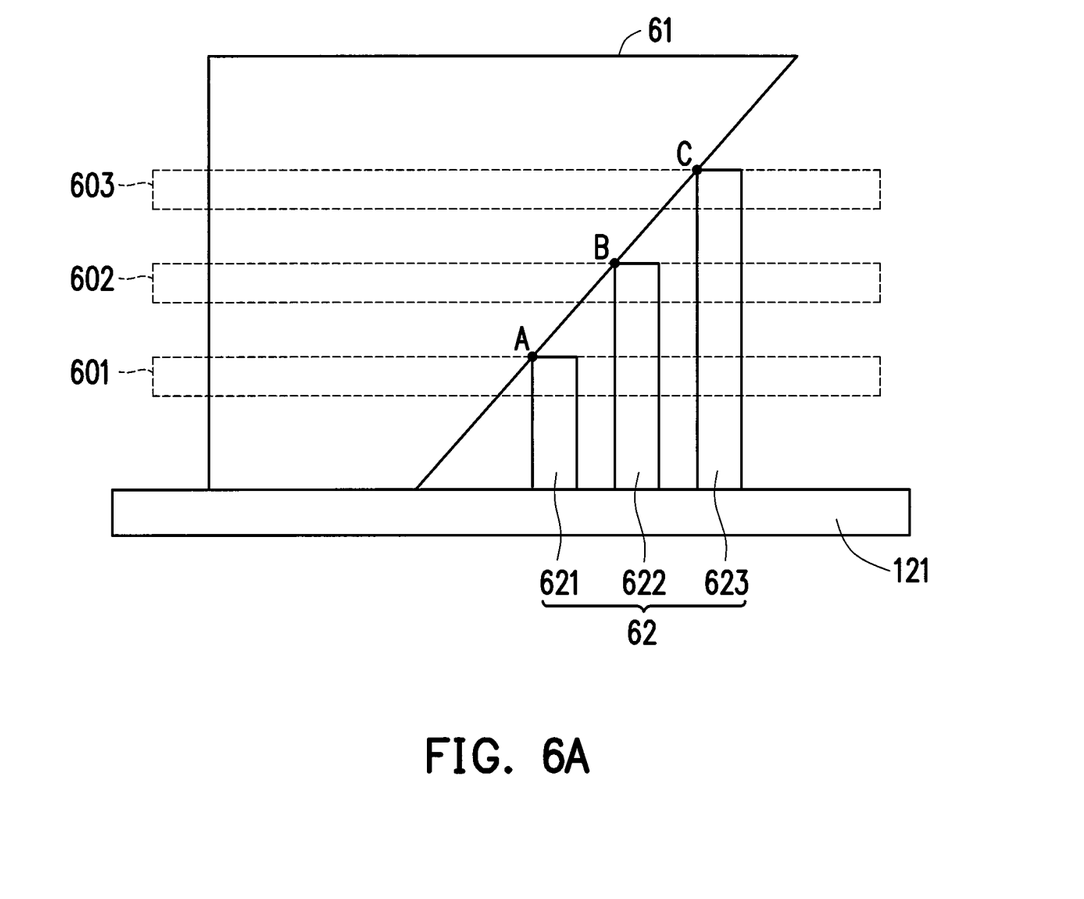
FIG. 6A is a schematic diagram illustrating an ordinary 3-D object and a supporting object thereof.

FIG. 6A is a schematic diagram illustrating an ordinary 3-D object and a supporting object thereof. It should be noted that FIG. 6A to FIG. 6D are also side views of the platform 121, the 3-D object and the supporting object thereof printed out on the platform 121. Referring to FIG. 6A, in an ordinary 3-D printing mechanism, if a 3-D object 61 needs support, a supporting object 62 is printed out together with the 3-D object 61. For example, the supporting object 62 may include supporting structures 621 to 623. Particularly, the printed supporting object 62 is not intentionally controlled not to contact the 3-D object 61. For example, the supporting structures 621 to 623 respectively contact the contact points A, B and C of the 3-D object 61 on the printing layers 601 to 603. In this circumstance, when the printing operation of the 3-D object 61 is completed, the supporting object 62 which is synchronously printed may be difficult to disassemble.

Figure 6B:
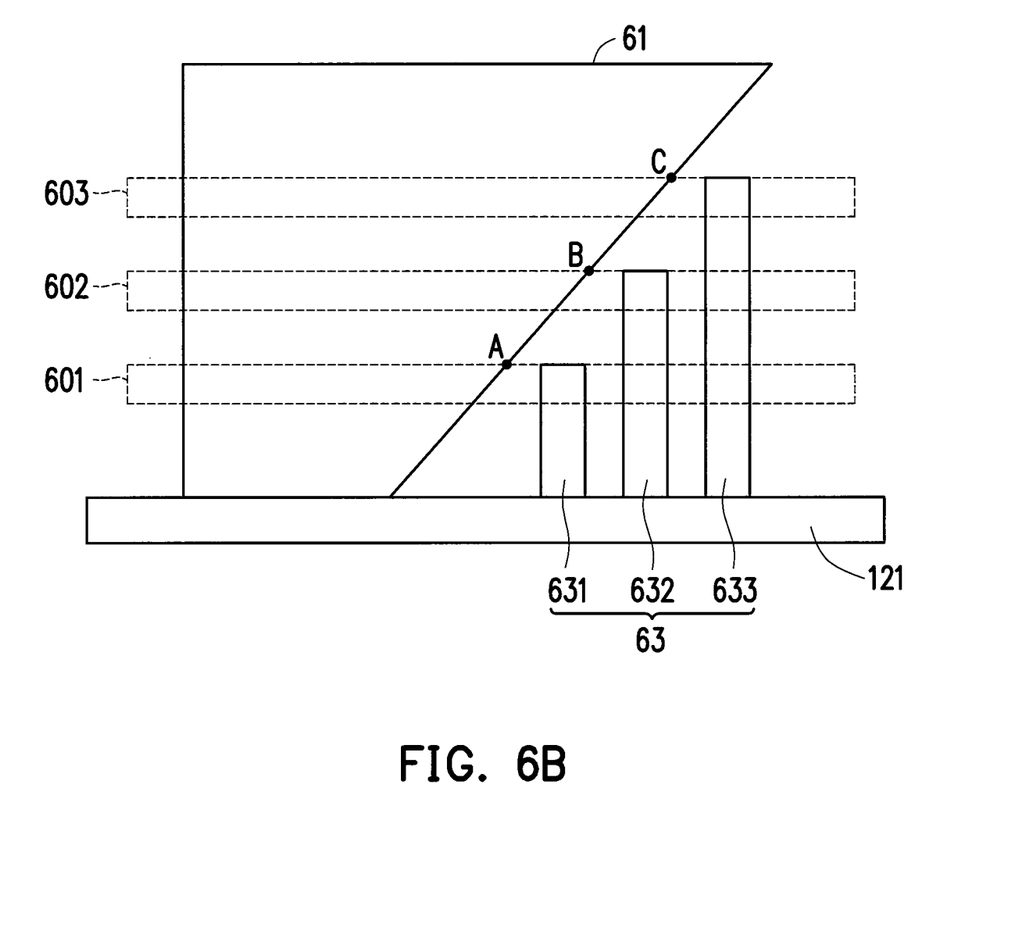
FIG. 6B to FIG. 6D are schematic diagrams illustrating 3-D objects and supporting objects thereof according to a plurality of embodiments of the disclosure.

FIG. 6B to FIG. 6D are schematic diagrams illustrating 3-D objects and supporting objects thereof according to a plurality of embodiments of the disclosure. Referring to FIG. 6B, in an embodiment, if the 3-D object 61 needs support, a supporting object 63 is printed out together with the 3-D object 61. For example, the supporting object 63 includes supporting structures 631 to 633. With respect to FIG. 6A, the supporting structures 631 to 633 are separated from the inclined surface of the 3-D object 61 by a distance on the printing layers 601 to 603, respectively, such that after the 3-D object 61 is pressed down by the gravity, the supporting object 63 does not seriously jam the contact points A, B and C.

Figure 6C:
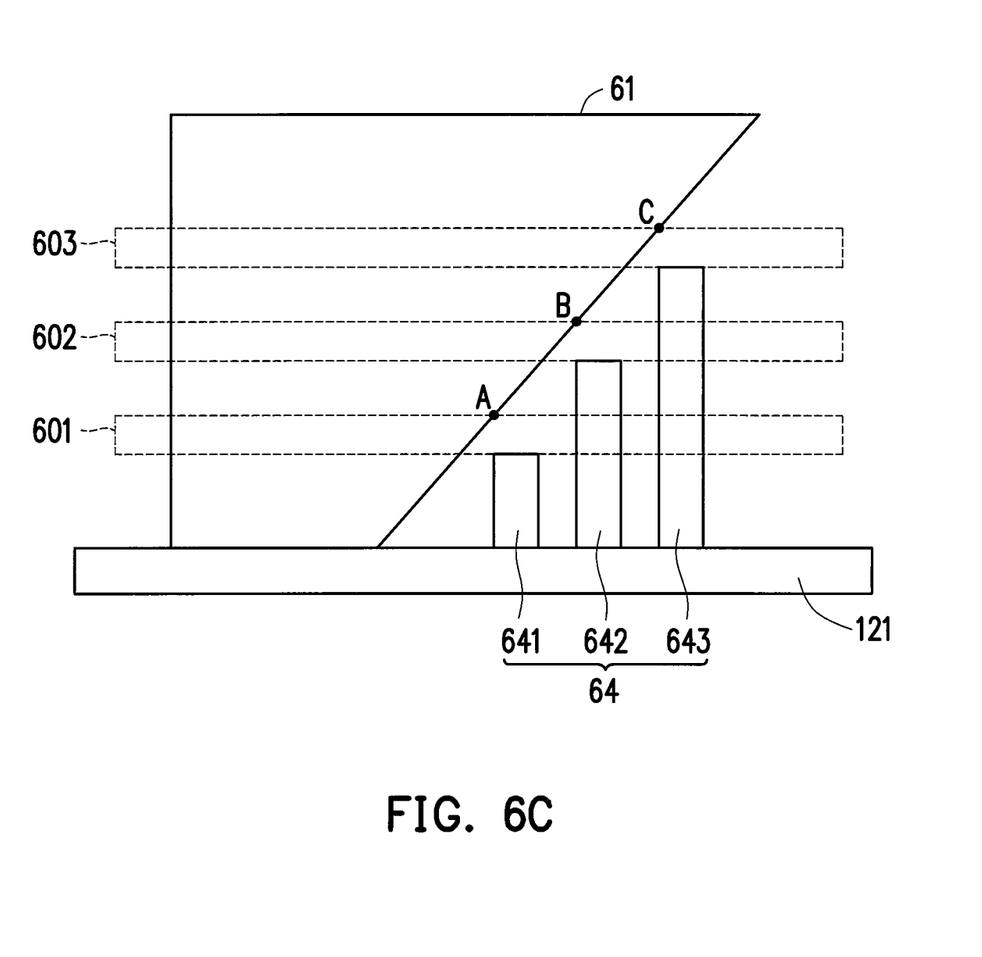

Referring to FIG. 6C, in an embodiment, if the 3-D object 61 needs support, a supporting object 64 is printed out together with the 3-D object 61. For example, the supporting object 64 includes supporting structures 641 to 643. With respect to FIG. 6A, a layer (e.g., the top layer) is decreased in the printing for each of the supporting structures 641 to 643, such that after the 3-D object 61 is pressed down by the gravity, the supporting object 64 does not seriously jam the contact points A, B and C.

Figure 6D:
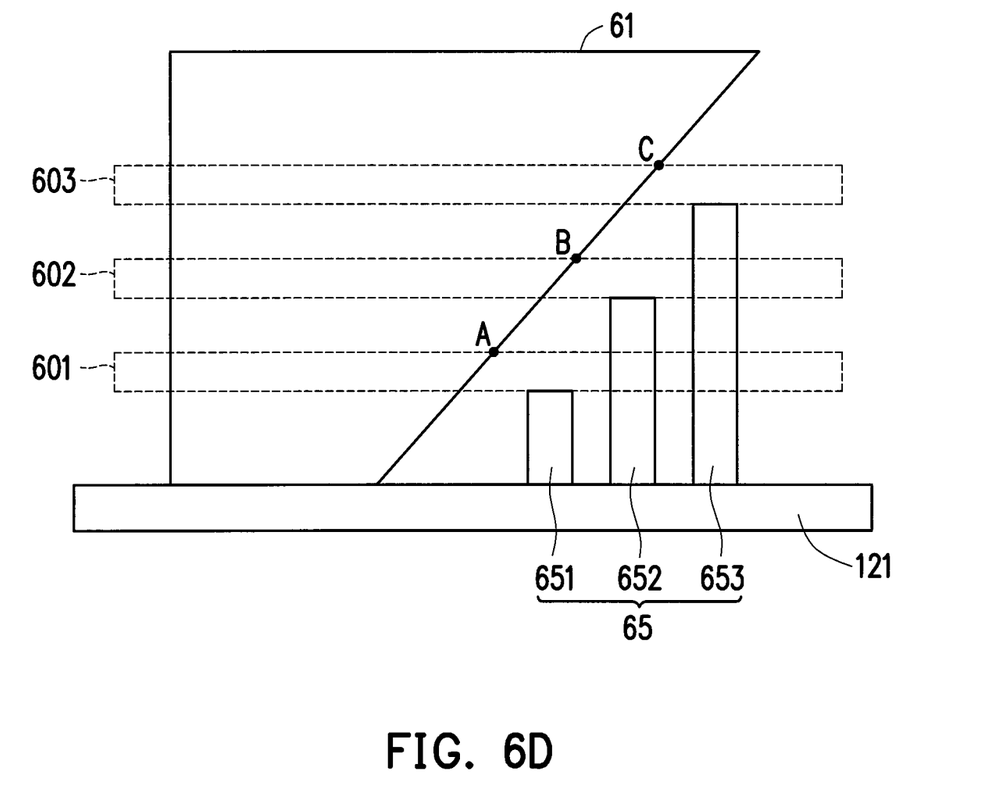

Referring to FIG. 6D, in an embodiment, if the 3-D object 61 needs support, a supporting object 65 is printed out together with the 3-D object 61. For example, the supporting object 65 includes supporting structures 651 to 653. With respect to FIG. 6A, the supporting structures 651 to 653 are separated from the inclined surface of the 3-D object 61 by a distance on the printing layers 601 to 603, respectively, and a layer is decreased in the printing for each of the supporting structures 651 to 653. Thereby, it may be further ensured that after the 3-D object 61 is pressed down by the gravity, the supporting object 65 does not seriously jam the contact points A, B and C.

It should be noted that in the embodiments described above, the main body and the extension portion of the 3-D object are defined for descriptive convenience, and may construe no limitations to the disclosure. In another embodiment, the 3-D object having the inclined surface may be considered as having both the main body and the extension portion. In addition, the printed extension portion actually may contact the supporting object thereunder due to the gravity.

Figure 7:
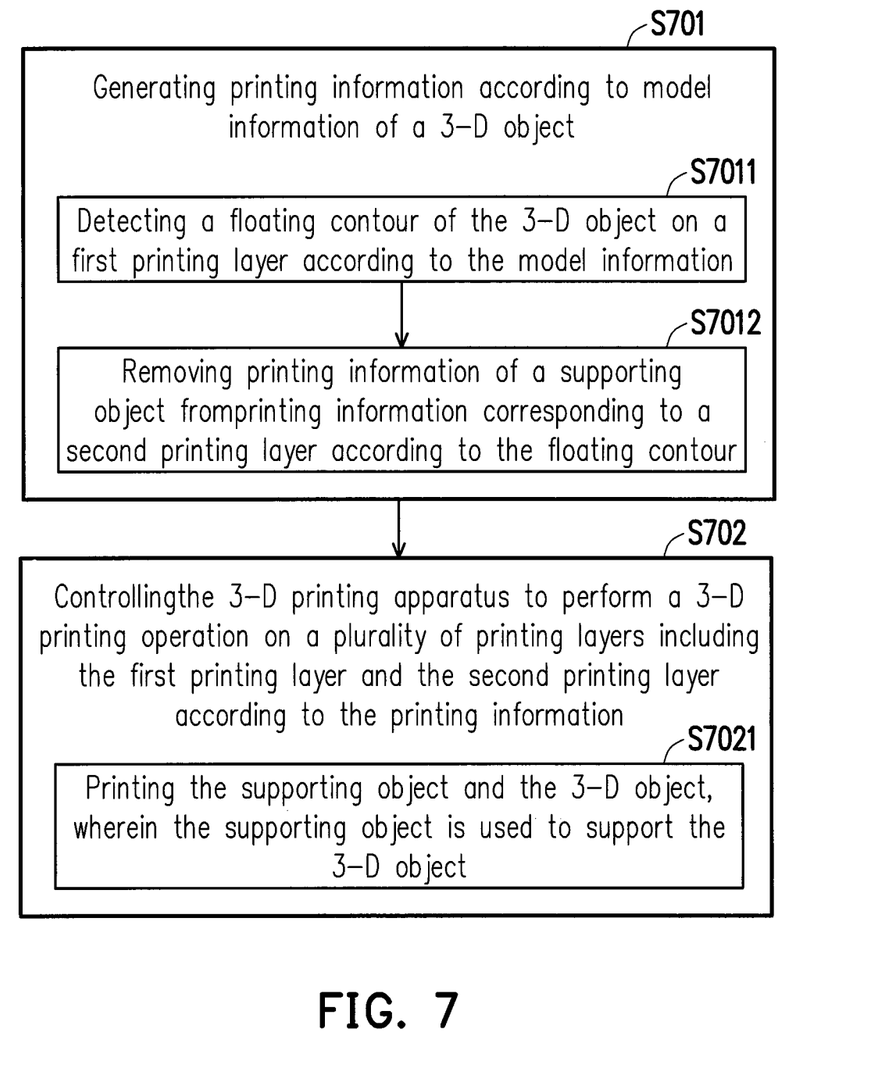
FIG. 7 is a flowchart illustrating a 3-D printing method according to an embodiment of the disclosure.

FIG. 7 is a flowchart illustrating a 3-D printing method according to an embodiment of the disclosure. Referring to FIG. 7, in step S701, printing information is generated according to model information of a 3-D object. Step S701 includes step S7011 and step S7012. In step S7011, a floating contour of the 3-D object on a first printing layer is detected according to the model information. In step S7012, printing information of a supporting object is removed from printing information corresponding to a second printing layer according to the floating contour. In step S702, a 3-D printing apparatus is controlled to perform a 3-D printing operation on a plurality of printing layers including the first printing layer and the second printing layer according to the printing information. The 3-D printing operation includes step S7021. In step S7021, the supporting object and the 3-D object are printed, where the supporting object is used to support the 3-D object.

However, each step of the method illustrated in FIG. 7 has been described in detail above and will not be repeated hereinafter. It should be noted that the steps of the method illustrated in FIG. 7 may be implemented as a plurality of program codes or circuits, without being limited in the disclosure. For example, in an embodiment, the storage apparatus 111 of the host 11 stores a plurality of modules, and the processor 112 of the host 11 may execute the modules to perform the corresponding operations in the 3-D printing method. Alternatively, in an embodiment, the processor 112 of the host 11 may include a plurality of circuits configured to perform the corresponding operations in the 3-D printing method. In addition, the method illustrated in FIG. 7 may be used with the embodiments described above or used alone, which is not limited in the disclosure.

To summarize, in the 3-D printing method and the 3-D printing system provided by the disclosure, the 3-D object can be separated from the supporting object by a distance based on the direction parallel to the printing layers of the 3-D object and/or the direction vertical to the printing layers of the 3-D object. In this way, after the 3-D printing operation of the 3-D object and the supporting object thereof is completed, the 3-D object and the supporting object can be easily separated from each other.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A three-dimensional (3-D) printing method, applicable to a 3-D printing system comprising a storage apparatus and a 3-D printing apparatus, wherein the storage apparatus is configured to store model information of a 3-D object, the 3-D printing method comprising:
    generating printing information according to the model information of the 3-D object, wherein the printing information comprises printing information corresponding to a first printing layer of the 3-D object and printing information corresponding to a second printing layer of the 3-D object, wherein the first printing layer is adjacent to the second printing layer; and
    controlling the 3-D printing apparatus to perform a 3-D printing operation on a plurality of printing layers comprising the first printing layer and the second printing layer according to the printing information, so as to print a supporting object and the 3-D object, wherein the supporting object is used to support the 3-D object,
    wherein the step of generating the printing information according to the model information of the 3-D object comprises:
        detecting a floating contour of the 3-D object on the first printing layer according to the model information; and
        removing printing information of the supporting object from the printing information corresponding to the second printing layer according to the floating contour,
        wherein a projection area of the floating contour on the second printing layer is not comprised in a contour range of the 3-D object on the second printing layer.

2. The 3-D printing method according to claim 1, wherein the plurality of printing layers further comprise a third printing layer, and the step of generating the printing information according to the model information of the 3-D object further comprises:
    obtaining a contour of the 3-D object on the third printing layer according to the model information; and
    performing an extending operation on the contour of the 3-D object on the third printing layer to obtain spacing information,
    wherein the spacing information corresponds to a distance between the 3-D object and the supporting object on the third printing layer, and the distance is greater than 0.

3. The 3-D printing method according to claim 2, wherein the step of generating the printing information according to the model information of the 3-D object further comprises:
    generating a contour of the supporting object on the third printing layer according to the contour of the 3-D object on the third printing layer and the spacing information; and
    generating printing information corresponding to the third printing layer among the printing information according to the contour of the 3-D object on the third printing layer and the contour of the supporting object on the third printing layer.

4. The 3-D printing method according to claim 2, wherein an extending direction of the extending operation is parallel to the third printing layer.

* * * * *